United States Patent
Lin (10) Patent No.: US 8,678,903 B1
(45) Date of Patent: Mar. 25, 2014

(54) MOBILE DEVICE HAVING A VIRTUAL SPIN WHEEL AND VIRTUAL SPIN WHEEL CONTROL METHOD OF THE SAME

(76) Inventor: Chia-Yen Lin, Dongguan (CN)

(*) Notice: Subject to any disclaimer, the term of this patent is extended or adjusted under 35 U.S.C. 154(b) by 0 days.

(21) Appl. No.: 13/613,300

(22) Filed: Sep. 13, 2012

(51) Int. Cl.
*G06F 17/00* (2006.01)
(52) U.S. Cl.
USPC .......................................................... 463/16
(58) Field of Classification Search
USPC ..................................... 463/16–25
See application file for complete search history.

(56) References Cited

U.S. PATENT DOCUMENTS

| | | | |
|---|---|---|---|
| 2009/0325607 A1* | 12/2009 | Conway et al. | 455/456.3 |
| 2013/0007654 A1* | 1/2013 | Tseng et al. | 715/786 |
| 2013/0079088 A1* | 3/2013 | Lafky et al. | 463/16 |

* cited by examiner

*Primary Examiner* — Ronald Laneau
(74) *Attorney, Agent, or Firm* — C. G. Mersereau; Nikolai & Mersereau, P.A.

(57) ABSTRACT

A virtual spin wheel control method of a mobile device having a rotation sensor has steps of generating a spin wheel image, dividing the spin wheel image into multiple target zones with each target zone corresponding to a selection result, setting up an initial alignment direction on the spin wheel image, receiving rotation data from the rotation sensor and calculating a rotation angle, adding the rotation angle to determine a final alignment direction, and determining a target zone to which the final alignment direction points and executing an operation corresponding to the selection result designated to the target zone. By spinning the mobile device to mimic Wheel of Fortune game, a selection result can be determined in place of the random number generator algorithm and the entire process is viewed by users. Accordingly, the virtual spin wheel control method is trustworthy and increases the effect of virtual reality vividly.

10 Claims, 7 Drawing Sheets

MOBILE DEVICE HAVING A VIRTUAL SPIN WHEEL AND VIRTUAL SPIN WHEEL CONTROL METHOD OF THE SAME

BACKGROUND OF THE INVENTION

1. Field of the Invention

The present invention relates to a mobile device and a method for controlling virtualization software thereof and more particularly to a mobile device having a virtual spin wheel and a virtual spin wheel control method of the mobile device.

2. Description of the Related Art

The diversification of application software (abbreviated as APP) in mobile devices is attributable to the rapid penetration of mobile devices, such as smart phones, tablet personal computers (Tablet PC) and the like, into all walks of life. Among those diversified application software nowadays, lots of application software is developed to simulate small games in real life for users of mobile devices to experience fun of various games.

Given a virtual coin tossing method currently available in a mobile device as an example, when executing the virtual coin tossing method, the mobile device displays an image of a coin for users to touch and toss the image with a hand and then displays a coin toss animation. The mobile device finally uses a random number generator algorithm to give a result, such as a random integer, and displays a head or a tail based on the result that may be an odd number or an even number. Besides, The image of coin can be replaced by an image of dice having six surfaces determined and displayed according to six determination results generated by a random number generator algorithm, such as a remainder when a generated random integer is divided by six.

Although the foregoing application software can simulate the virtual reality of coin or dice tossing, the tossing results heavily depend on the value randomly generated by the random number generator algorithm. As the random number generator algorithm is prone to manual alternation and the random number generation process fails to be transparent, the random number generator algorithm is hardly impartial and objective and the virtual software approach using the random number generator algorithm is not trustworthy in the public eye. Furthermore, as users simulate a coin or dice tossing movement by touching and tossing the image of a coin or a dice instead of actually tossing the coin or dice, the feel of a real coin or dice tossing is dramatically distinct from that of a virtual coin or dice tossing game with limited effect of virtual reality.

SUMMARY OF THE INVENTION

An objective of the present invention is to provide a mobile device having a virtual spin wheel and a virtual spin wheel control method with simulation effect resembling a spinning process of a real spin wheel.

To achieve the foregoing objective, the mobile device having a virtual spin wheel has a body, a rotation sensor and a processing module.

The body has a display mounted thereon.

The rotation sensor is mounted in the body.

The processing module is mounted in the body, is electrically connected to the display and the rotation sensor, is built in with a virtual spin wheel control procedure, and stores a spin wheel image and a pointer image. The virtual spin wheel control procedure reads the spin wheel image and the pointer image and displays the spin wheel image and the pointer image on the display, radially divides the spin wheel image into multiple angular target zones with each target zone defined to correspond to a selection result, sets up an initial alignment direction on the spin wheel image for the pointer image to point to the initial alignment direction, receives rotation data outputted from the rotation sensor and calculates a rotation angle of the mobile device according to the rotation data, adds the rotation angle to the initial alignment direction to determine a final alignment direction, determines a target zone on the pre-rotated spin wheel image of the mobile device to which the final alignment direction points, and executes an operation corresponding to the selection result designated to the target zone after the pointer image points to the target zone corresponding to the final alignment direction.

When executing the virtual spin wheel control procedure, users flatly place and rotate the body until the body stops spinning. The processing module then acquires rotation data through the rotation sensor to obtain a rotation angle of the body, thereby determining a target zone to which the final alignment direction points and simulating real life Wheel of Fortune game. As the entire course of a real spinning process of the mobile device is viewed by users and the alignment of the pointer image displayed on the mobile device before and after the spinning is also viewed by users, users can check if the selection result corresponds to the rotation angle. Besides, the rotation angle of the mobile device is not controlled by random number algorithm software. Accordingly, the coming result is trustworthy, increases the fun, excitement and simulation effect for the random selection approach thereof similar to a real spin wheel game.

To achieve the foregoing objective, the virtual spin wheel control method of a mobile device having a rotation sensor has steps of:

generating and displaying the spin wheel image and the pointer image;

radially dividing the spin wheel image into multiple angular target zones with each target zone defined to correspond to a selection result;

setting up an initial alignment direction on the spin wheel image for the pointer image to point to the initial alignment direction;

receiving rotation data outputted from the rotation sensor and calculating a rotation angle of the mobile device according to the rotation data;

adding the rotation angle to the initial alignment direction to determine a final alignment direction; and determining a target zone on the pre-rotated spin wheel image of the mobile device to which the final alignment direction points, and executing an operation corresponding to the selection result designated to the target zone after the pointer image points to the target zone corresponding to the final alignment direction.

Other objectives, advantages and novel features of the invention will become more apparent from the following detailed description when taken in conjunction with the accompanying drawings.

DETAILED DESCRIPTION OF THE INVENTION

It is common for current mobile devices to be equipped with application software to simulate some positioning devices and sensing devices, such as compass, GPS, accelerometer, gyroscope and the like. The application software for compass outputs angle data in a range of 0° to 360°. The application software for GPS outputs a set of data associated with longitude and latitude. The application software for accelerometer outputs acceleration of gravity with respect to an orthogonal coordinate system. The application software for gyroscope outputs angular acceleration data around the rotation axes. Besides the information acquired from each positioning and sensing device, the application software can also acquire quaternion, rotation matrix, Euler angles and the like required for representation of rotation using the sensor fusion in the mobile devices.

Figure 1:
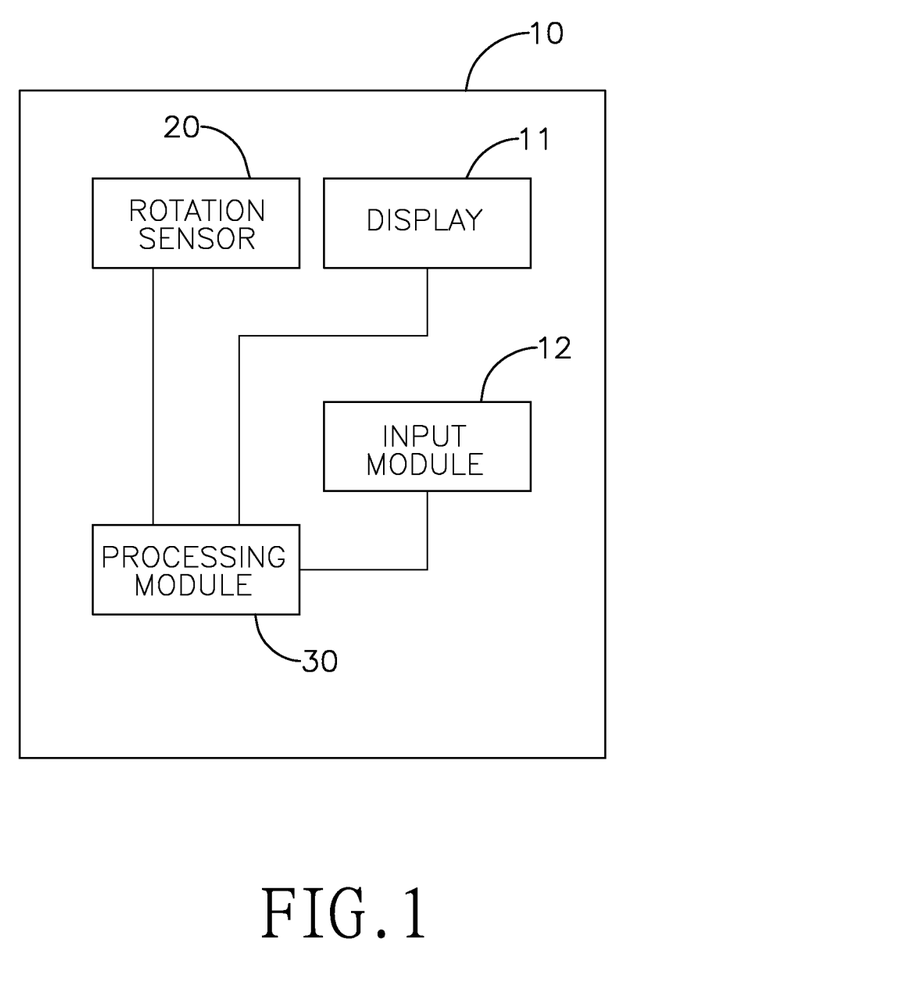
FIG. 1 is a functional block diagram of a mobile device in accordance with the present invention.

With reference to FIG. 1, a mobile device having a virtual spin wheel has a body 10, a rotation sensor 20 and a processing module 30.

The body 10 has a display 11 mounted thereon. In the present embodiment, the body 10 further has an input module 12 mounted thereon.

The rotation sensor 20 is mounted in the body 10, and may be a compass or a gyroscope.

The processing module 30 is mounted in the body 10, is electrically connected to the display 11 and the rotation sensor 20, is built in with a virtual spin wheel control procedure, and stores a spin wheel image and a pointer image. In the present embodiment, the processing module 30 is electrically connected to the input module 12.

Figure 2:
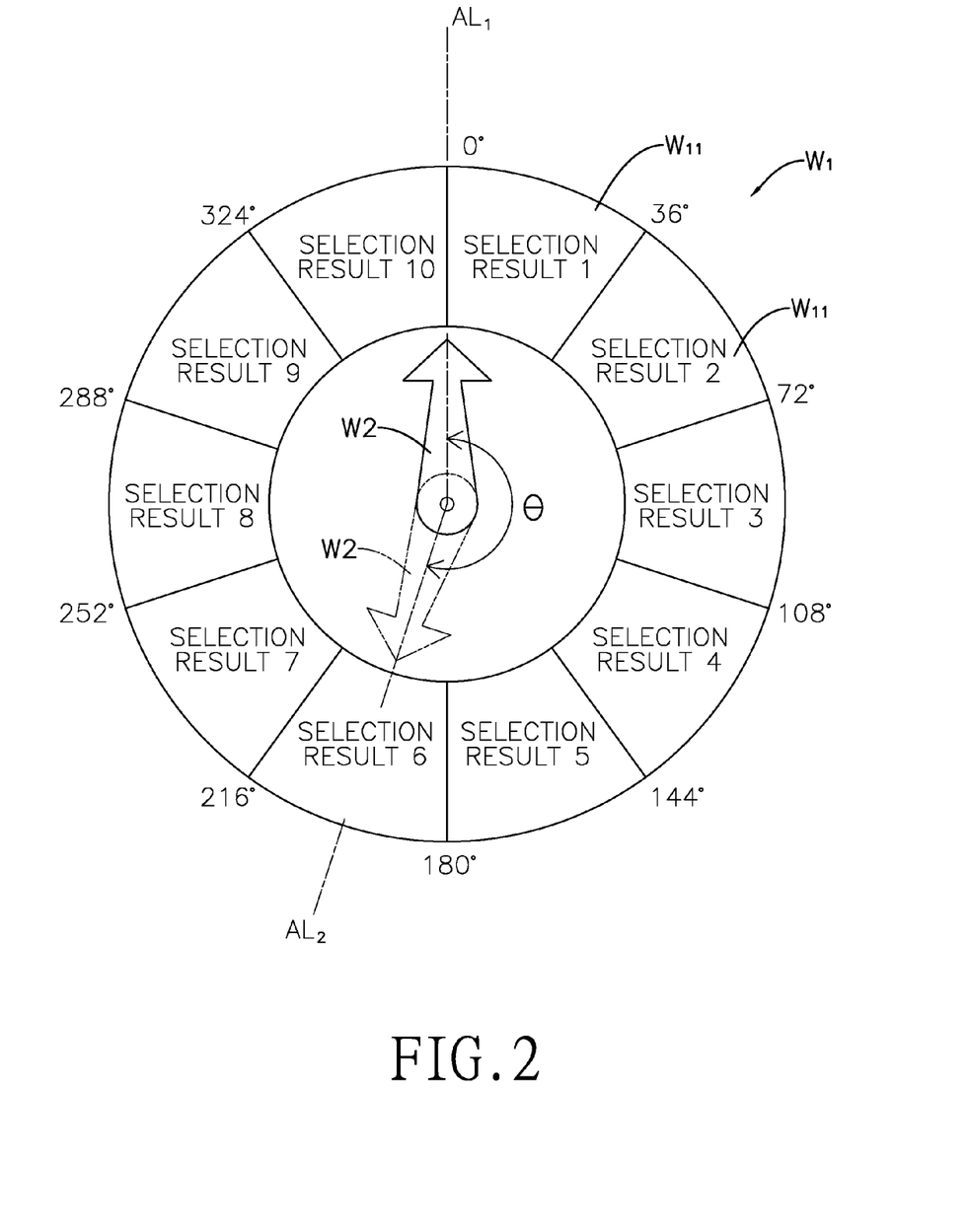
FIG. 2 is a schematic view of a virtual spin wheel having multiple target zones and a pointer in accordance with the present invention.
Figure 3:
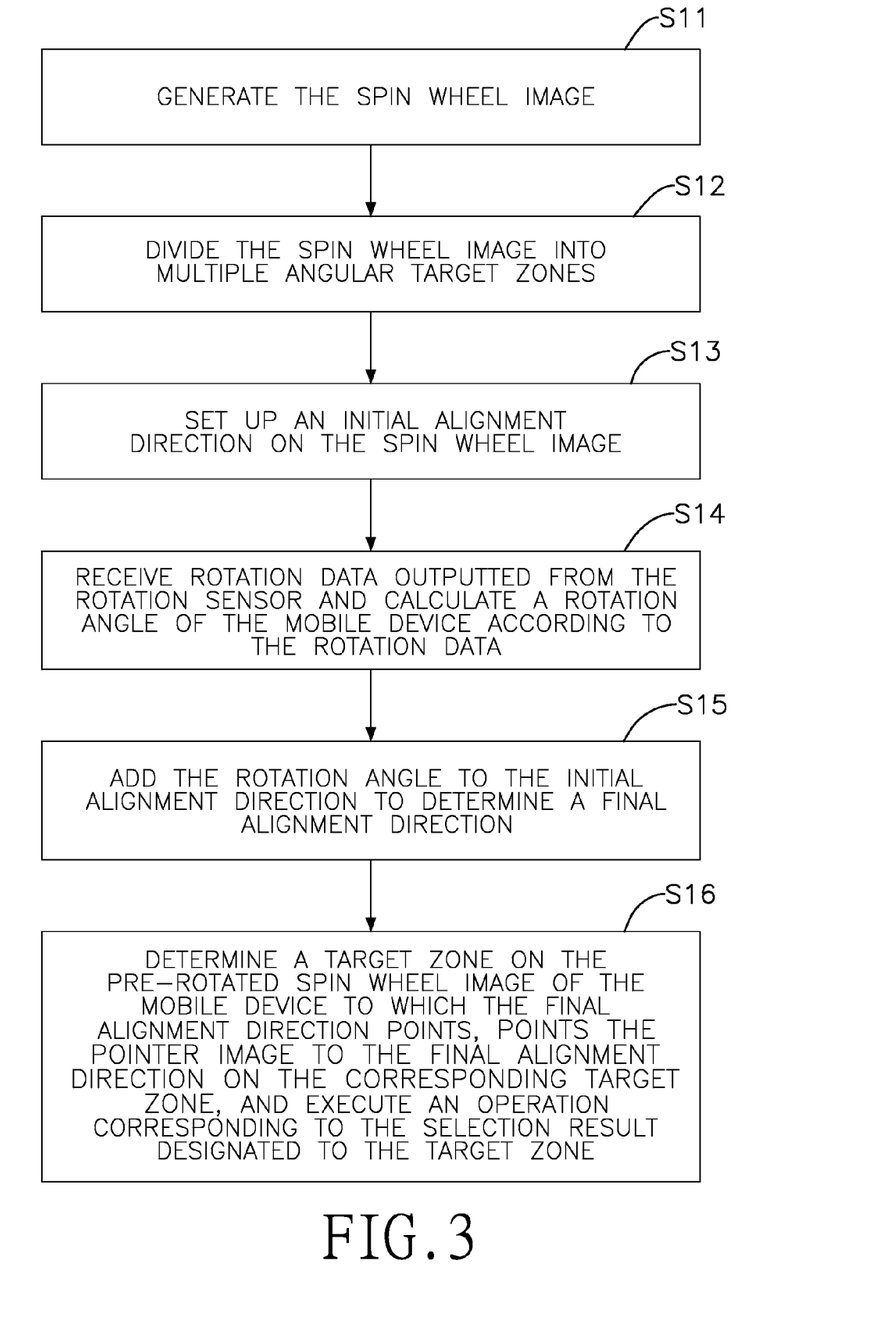
FIG. 3 is a flow diagram of a virtual spin wheel control method performed by the mobile device in FIG. 1.

With reference to FIGS. 2 and 3, the virtual spin wheel control procedure has the following steps.

Step S11: Generate the spin wheel image W1 or read the spin wheel image W1 built in the processing module 30. In the present embodiment, the processing module 30 displays the spin wheel image W1 to increase the simulation effect and the fun of the game.

Figure 4:
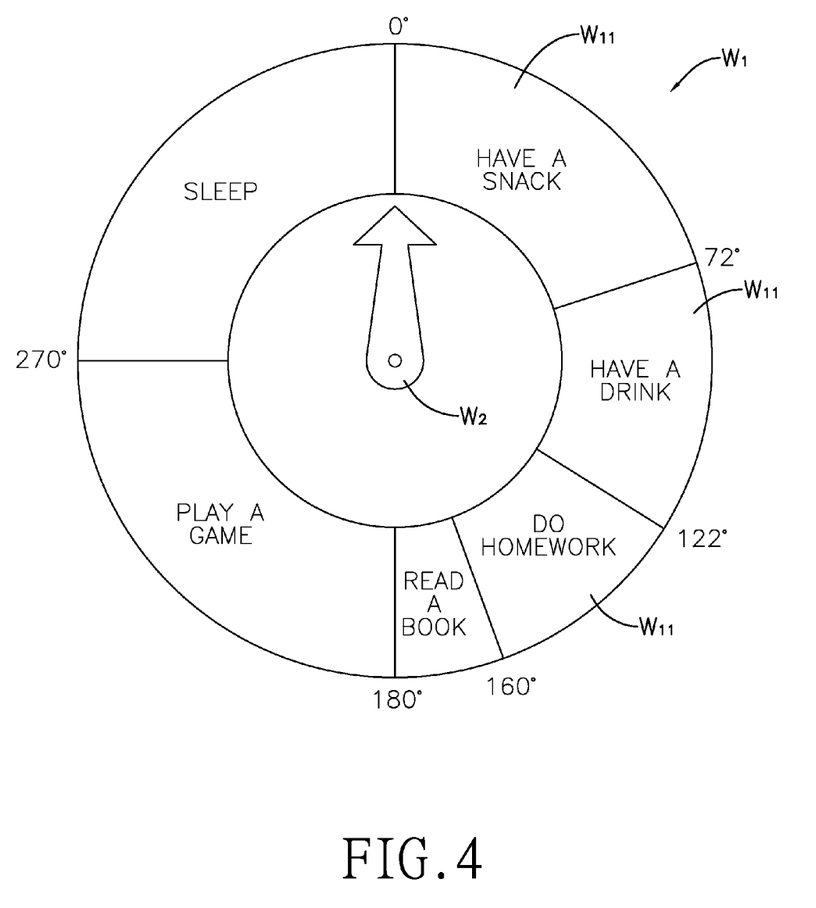
FIG. 4 is a schematic view of the virtual spin wheel in FIG. 2 having multiple target zones with different angular ranges.

Step S12: Divide the spin wheel image W1 into multiple angular target zones W11. Each target zone W11 is defined to correspond to a selection result. In the present embodiment, the selection result of each target zone W11 is inputted through the input module 12. The input module 12 may be a touch panel or mechanical press buttons. Furthermore, the spin wheel image W1 is evenly divided into ten target zones W11 and each target zone W11 is allocated to 36°. With reference to FIG. 4, the target zones W11 differ in size and angular range so that users can adjust the probability of each selection result based on personal preference.

Step S13: Set up an initial alignment direction $AL_1$ on the spin wheel image W1 for the initial alignment direction $AL_1$ to point to one of the target zones W11 (or points to a border line between adjacent two of the target zones W11). In the present embodiment, further read and display the pointer image W2 and let the pointer image W2 point to the initial alignment direction $AL_1$. The initial alignment direction can be configured to point to a top edge, a bottom edge or any other direction.

Step S14: Receive rotation data outputted from the rotation sensor 20 and calculate a rotation angle θ of the mobile device according to the rotation data. Methods for calculating the rotation angle θ with the types of the rotation sensors 20 are discussed in details later.

Step S15: Add the rotation angle θ to the initial alignment direction $AL_1$ to determine a final alignment direction $AL_2$.

Step S16: Determine a target zone W11 on the pre-rotated spin wheel image W1 of the mobile device to which the final alignment direction $AL_2$ points, and execute an operation corresponding to the selection result designated to the target zone W11 after the pointer image W2 points to the target zone W11 corresponding to the final alignment direction $AL_2$. In the present embodiment, each selection result may be operation of one of an animation, audio information or an image. In the present step, the display 11 plays an animation, audio information or an image according to the selection result designated to the target zone W11 to which the final alignment direction $AL_2$ points.

Even the virtual spin wheel control method does not display the spin wheel image W1 and the pointer image W2, users can still spin the body 10 of the mobile device, and the selection result can be displayed after the body 10 stops spinning. However, if the virtual spin wheel control method displays the spin wheel image W1 and the pointer image W2, users can actually view the whole process of relative rotation of the spin wheel image W1 and the pointer image W2, and the spin wheel image W1 or the pointer image W2 is rotated according to the received rotation data. While the spin wheel image W1 or the pointer image W2 is rotated, people participating in the spin wheel game can view if the entire course matches the actual rotation of the mobile device, which makes the virtual spin wheel control method more trustworthy and vividly demonstrating the simulation effectiveness.

In view of different data outputted from a compass and a gyroscope, Step S14 for calculating a rotation angle is further described as follows to reflect the case that the rotation sensor 20 is a compass or a gyroscope.

Figure 5:
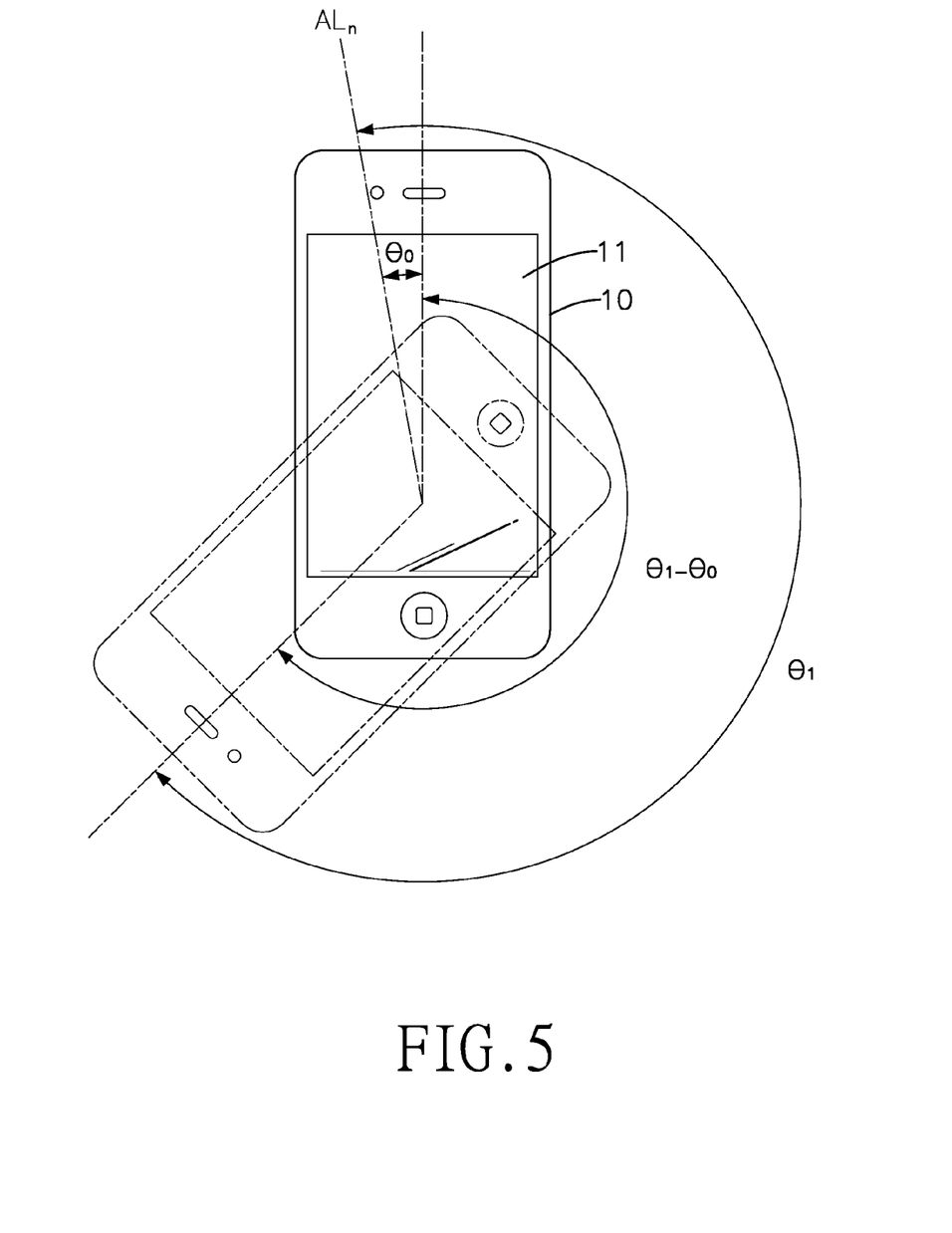
FIG. 5 is a schematic view illustrating a rotation angle of a mobile device in accordance with the present invention.

If the rotation sensor 20 is a compass, with reference to FIG. 5, the compass first detects a reference angle $θ_0$ between an initial alignment direction of the mobile device and the geomagnetic south (or north) pole $AL_n$ of the earth. The initial alignment direction of the mobile device may be at an angle between 0° and 360° measured with respect to a center line of the mobile device. After the mobile device is flatly placed and rotated, the angle data outputted from the compass keep changing. Once the angle data outputted by the compass stop changing, it means that the mobile device has stopped spinning and the angle data by then is taken as a final angle $θ_1$, which is measured with respect to the geomagnetic south pole or north pole. A rotation angle θ is obtained by subtracting the reference angle from the final angle $(θ_1-θ_0)$.

If the rotation sensor 20 is a gyroscope, an angle $θ_α$ (0° to 360°) is selected in Step S13 for setting up an initial alignment direction. And in step S14, the rotation angle can be calculated from a series of angular acceleration data. The angular acceleration of the mobile device can be expressed as a function of time, $f_α(t)$, and is used to calculate the rotation angle, which can be obtained by the following equation, namely, $\iint f_α(t) \cdot dt \cdot dt$.

Figure 6A:
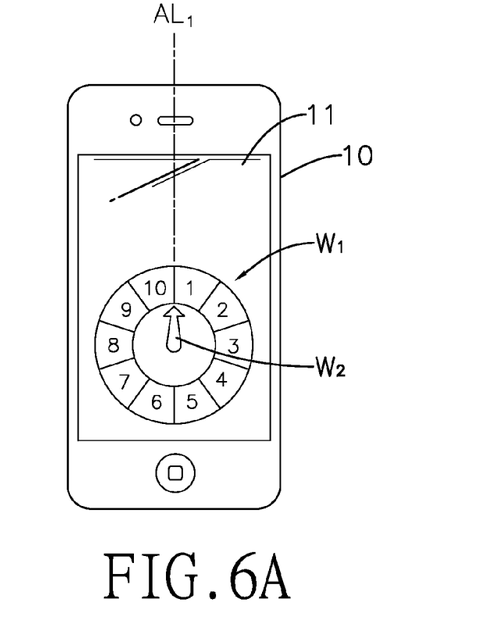
FIG. 6A is a schematic view of the mobile device in FIG. 5 with a stationary pointer to the mobile device prior to rotation.
Figure 6B:
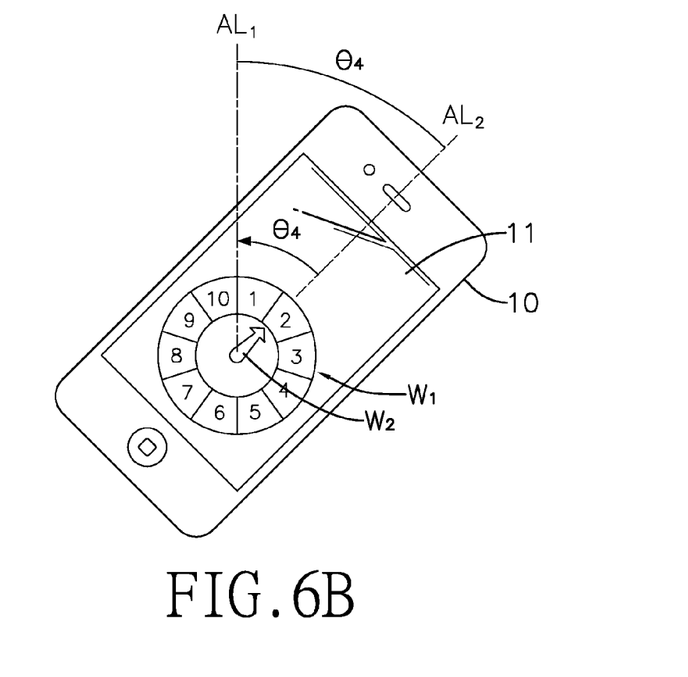
FIG. 6B is a schematic view of the mobile device in FIG. 5 with a stationary pointer to the mobile device after rotation.
Figure 7A:
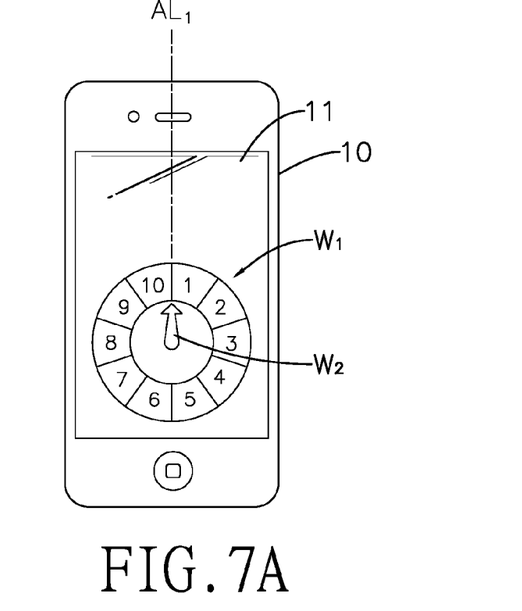
FIG. 7A is a schematic view of the mobile device in FIG. 5 with stationary target zones to the mobile device prior to rotation.
Figure 7B:
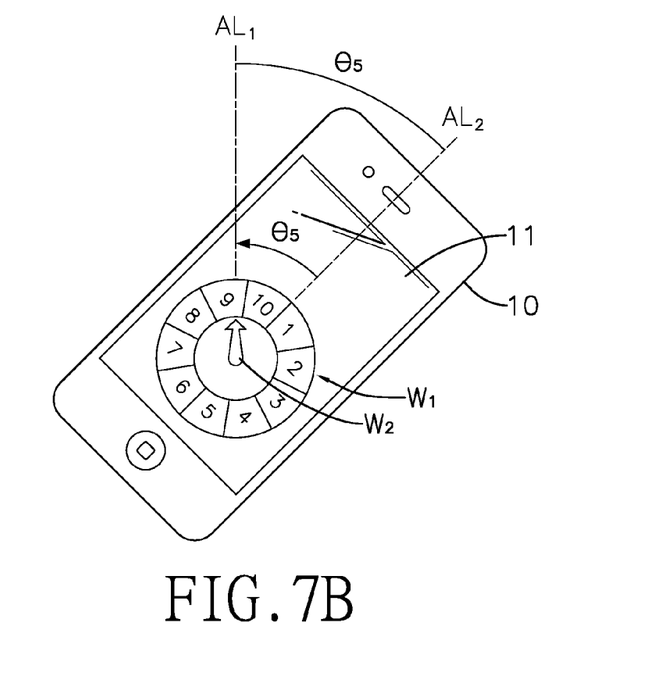
FIG. 7B is a schematic view of the mobile device in FIG. 5 with stationary target zones to the mobile device after rotation.

Furthermore, in the last step of displaying the pointer image W2 corresponding to the final direction $AL_2$ on one of the target zones W11, either the pointer image W2 can be set to be stationary to the mobile device while the spin wheel image W1 is set to be rotatable or vice versa. For example, in FIGS. 6A and 6B, the pointer image W2 in the display is stationary to the mobile device. And when the mobile device is rotated, the spin wheel image W1 is rotated by an identical angle in a reverse direction. In FIG. 6A, before the mobile device is rotated, the pointer image W2 points to a border line between the target zone 10 and the target zone 1 on the spin wheel image W1. And in FIG. 6B, after the mobile device 10 is rotated by an angle $\theta_4$, the spin wheel image W1 is rotated by the angle of $\theta_4$ in a reverse direction, allowing the stationary pointer image W2 to point to the corresponding target zone 2. However, from the perspective of users, it appears that the spin wheel is stationary while the pointer is rotated. With reference to FIGS. 7A and 7B, the spin wheel image W1 is stationary to the mobile device. And in FIG. 7B, after the mobile device is rotated by an angle $\theta_5$, the pointer image W2 is rotated by the angle $\theta_5$ in a reverse direction, allowing it to point to the corresponding target zone of the stationary spin wheel image W1. However, from the perspective of users, it appears to users that the pointer is stationary and it is the spin wheel that is rotating.

To randomly select one of the selection results with the foregoing virtual spin wheel control method, users need to flatly place and rotate the body 10 of the mobile device. After the body 10 stops spinning due to friction, the rotation angle defined by the body 10 determines the final alignment direction $AL_2$. The final alignment direction $AL_2$ aligns with the selection result of one of the target zones W11. As software cannot control when the mobile device stops spinning, users spin the mobile device as they spin Wheel of Fortune with pointer stopping randomly at the divided target zones. Participants of the spin wheel game can observe the wheel-spinning process throughout the entire process, and physically check the rotation angle in display to see if it matches the rotation angle of the mobile device. This not only ensures a trustworthy and credible spin wheel game but also increases the fun and excitement of users when observing the wheel-spinning process and awaiting a result of the game. Moreover, because the method of spinning the spin wheel image W1 (or the pointer image W2) is performed by users to rotate the body 10 of the mobile device, the method can also simulate a real wheel-spinning situation, thereby making the simulation more vivid.

In sum, the present invention allows users to spin a mobile device for a spin wheel image or a pointer image displayed on the mobile device to rotate, generates a random result determined by a process of rotating mobile device, which mimics the Wheel of Fortune game to make application software in mobile devices more entertaining.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A mobile device having a virtual spin wheel, comprising:
   a body having a display mounted thereon;
   a rotation sensor mounted in the body; and
   a processing module mounted in the body, electrically connected to the display and the rotation sensor, having a virtual spin wheel control procedure, and storing a spin wheel image and a pointer image, wherein the virtual spin wheel control procedure reads the spin wheel image and the pointer image and displays the spin wheel image and the pointer image on the display, divides the spin wheel image into multiple angular target zones with each target zone defined to correspond to a selection result, sets up an initial alignment direction on the spin wheel image for the pointer image to point to the initial alignment direction, receives rotation data outputted from the rotation sensor and calculates a rotation angle of the mobile device according to the rotation data, adds the rotation angle to the initial alignment direction to determine a final alignment direction, determines one of the target zones on the spin wheel image of the mobile device to which the final alignment direction points, points the pointer image to the final alignment direction on the corresponding target zone, and executes an operation corresponding to the selection result designated to the target zone.

2. The mobile device as claimed in claim 1, wherein
   the rotation sensor is a compass;
   the initial alignment direction of the mobile device is at an angle between 0° and 360° measured with respect to a center line of the mobile device; and
   the compass first detects a reference angle between the initial alignment direction of the mobile device and the geomagnetic south or north pole of the earth; and
   the processing module monitors if angle data outputted from the compass keep changing after the mobile device is rotated, determines if the mobile device has stopped spinning, takes the angle data as a final angle when the angle data outputted by the compass stop changing, and obtains the rotation angle by subtracting the reference angle from the final angle.

3. The mobile device as claimed in claim 1, wherein
   the rotation sensor is a gyroscope and the rotation data are a series of angular acceleration data;
   the initial alignment direction of the mobile device is at an angle between 0° and 360° measured with respect to a center line of the mobile device; and
   the processing module continuously receives the series of the angular acceleration data, and obtains the rotation angle by a calculation.

4. The mobile device as claimed in claim 1, wherein the pointer image displayed on the mobile device is stationary, and when the mobile device is rotated, the spin wheel image is rotated by an identical angle in a reverse direction so that the pointer image points to one of the target zones on the spin wheel image corresponding to the final alignment direction.

5. The mobile device as claimed in claim 1, wherein the spin wheel image displayed on the mobile device is stationary, and when the mobile device is rotated, the pointer image is rotated by an identical angle in a reverse direction so that the pointer image points to one of the target zones on the spin wheel image corresponding to the final alignment direction.

6. A virtual spin wheel control method of a mobile device, wherein the mobile device has a rotation sensor, the method comprising steps of:
   generating and displaying a spin wheel image and a pointer image on the mobile device;
   dividing the spin wheel image into multiple angular target zones with each target zone defined to correspond to a selection result;
   setting up an initial alignment direction on the spin wheel image for the pointer image to point to the initial alignment direction;

receiving rotation data outputted from the rotation sensor and calculating a rotation angle of the mobile device according to the rotation data;

adding the rotation angle to the initial alignment direction to determine a final alignment direction; and determining one of the target zones on the spin wheel image of the mobile device to which the final alignment direction points, pointing the pointer image to the final alignment direction on the corresponding target zone, and executing an operation corresponding to the selection result designated to the target zone.

7. The mobile device as claimed in claim 6, wherein the rotation sensor is a compass;

in the step of setting up the initial alignment direction, the initial alignment direction of the mobile device is at an angle between 0° and 360° measured with respect to a center line of the mobile device; and the step of receiving rotation data and calculating a rotation angle has steps of:

detecting a reference angle between the initial alignment direction of the mobile device and the geomagnetic south or north pole of the earth;

monitoring if angle data outputted from the compass keep changing after the mobile device is rotated;

determines if the mobile device has stopped spinning;

taking the angle data acquired as a final angle when the angle data outputted by the compass stop changing; and obtaining the rotation angle by subtracting the reference angle from the final angle.

8. The mobile device as claimed in claim 6, wherein the rotation sensor is a gyroscope and the rotation data are a series of angular acceleration data;

in the step of setting the initial alignment direction, the initial alignment direction of the mobile device is at an angle between 0° and 360° measured with respect to a center line of the mobile device; and the step of receiving rotation data and calculating a rotation angle has steps of:

continuously receiving the series of angular acceleration data; and obtaining the rotation angle by a calculation.

9. The mobile device as claimed in claim 6, wherein in the step of receiving rotation data and calculating a rotation angle, the pointer image displayed on the mobile device is stationary, and when the mobile device is rotated, the spin wheel image is rotated by an identical angle in a reverse direction so that the pointer image points to one of the target zones on the spin wheel image corresponding to the final alignment direction.

10. The mobile device as claimed in claim 6, wherein in the step of receiving rotation data and calculating a rotation angle, the spin wheel image displayed on the mobile device is stationary, and when the mobile device is rotated, the pointer image is rotated by an identical angle in a reverse direction so that the pointer image points to one of the target zones on the spin wheel image corresponding to the final alignment direction.

* * * * *